United States Patent
Jung et al.

(10) Patent No.: US 10,278,371 B2
(45) Date of Patent: May 7, 2019

(54) METHOD OF CONTROLLING CULTURE WATER TEMPERATURE IN A WATER TANK FOR AQUARIUM FISH AND A CULTURE WATER THERMOSTAT USING A PLURALITY OF PELTIER ELEMENTS

(71) Applicant: REPUBLIC OF KOREA (NATIONAL FISHERIES RESEARCH AND DEVELOPMENT INSTITUTE), Busan (KR)

(72) Inventors: Minmin Jung, Jeju-do (KR); Bongseok Kim, Busan (KR); Jaeu Kim, Jeju-do (KR); Sanggu Lim, Busan (KR)

(73) Assignee: NATIONAL FISHERIES RESEARCH AND DEVELOPMENT INSTITUTE, Busan (KR)

( * ) Notice: Subject to any disclaimer, the term of this patent is extended or adjusted under 35 U.S.C. 154(b) by 0 days.

(21) Appl. No.: 15/117,391

(22) PCT Filed: Jun. 22, 2015

(86) PCT No.: PCT/KR2015/006286
§ 371 (c)(1),
(2) Date: Aug. 8, 2016

(87) PCT Pub. No.: WO2016/148344
PCT Pub. Date: Sep. 22, 2016

(65) Prior Publication Data
US 2017/0208783 A1    Jul. 27, 2017

(30) Foreign Application Priority Data

Mar. 17, 2015 (KR) .......... 10-2015-0036633
Mar. 17, 2015 (KR) .......... 10-2015-0036646

(51) Int. Cl.
*F25B 21/00* (2006.01)
*A01K 63/02* (2006.01)
(Continued)

(52) U.S. Cl.
CPC ............ *A01K 63/065* (2013.01); *F25B 21/02* (2013.01)

(58) Field of Classification Search
CPC ...... F25B 23/02; F25B 23/04; F25B 2321/02; F25B 2321/021; F25B 2321/0211;
(Continued)

(56) References Cited

U.S. PATENT DOCUMENTS

| 5,515,683 A * | 5/1996 | Kessler ............... F25B 21/04 62/3.3 |
| 2005/0183431 A1* | 8/2005 | Rabal ................ A01K 63/02 62/185 |

(Continued)

FOREIGN PATENT DOCUMENTS

| EP | 0862901 A1 * | 9/1998 | ............... A61F 7/00 |
| JP | H09294505 | 11/1997 | |

(Continued)

*Primary Examiner* — Frantz Jules
*Assistant Examiner* — Erik Mendoza-Wilkenfe
(74) *Attorney, Agent, or Firm* — IPLA P.A.; James E. Bame

(57) ABSTRACT

A peltier device comprises peltier elements specified in cooling or heating temperature, a heating heat sink connected in contact on one side surface of the peltier element, a chilling heat sink connected in contact on the other side surface of the peltier element, and a cooling fan. Using peltier elements each of which is specified in a cooling or a heating activity, a heat exchange efficiency is enhanced thank to a plurality of functions of a single peltier element; thermal radiation is separated by bringing the peltier element into contact with a heating heat sink and a cooling heat sink independently from each other; the surface area in contact (Continued)

with the fluid is maximized through the "X" shaped aperture formed with four wings protruding from the inner surface of the aperture towards the center part, directly transferring the endothermic and exothermic effects from the Peltier element to the fluid.

2 Claims, 8 Drawing Sheets

(51) Int. Cl.
    *F28F 3/02*     (2006.01)
    *F28F 3/04*     (2006.01)
    *A01K 63/06*     (2006.01)
    *F25B 21/02*     (2006.01)

(58) Field of Classification Search
    CPC ........ F25B 2321/0212; F25B 2321/023; F25B 2321/0252; A01K 63/02; H05K 2201/10219; F28F 3/02; F28F 3/06
    See application file for complete search history.

(56) References Cited

U.S. PATENT DOCUMENTS

| | | | |
|---|---|---|---|
| 2006/0179848 A1* | 8/2006 | Chen | F25B 21/02 62/3.2 |
| 2009/0056344 A1* | 3/2009 | Poch | A61M 1/369 62/3.3 |
| 2012/0210732 A1* | 8/2012 | Hoehmann | F24D 3/18 62/3.3 |
| 2012/0291997 A1* | 11/2012 | Chen | H01L 23/473 165/104.13 |

FOREIGN PATENT DOCUMENTS

| | | |
|---|---|---|
| JP | H11262343 | 9/1999 |
| KR | 2009090292 | 8/2009 |
| KR | 20130043804 | 5/2013 |

\* cited by examiner cooling fan heating heat sink peltier elements chilling heat sink

METHOD OF CONTROLLING CULTURE WATER TEMPERATURE IN A WATER TANK FOR AQUARIUM FISH AND A CULTURE WATER THERMOSTAT USING A PLURALITY OF PELTIER ELEMENTS The language within is a certified English translation of the applicant's documents submitted with the 371 application.

BACKGROUND

The present invention relates to a culture water thermostat in a water tank for aquarium fish and a method of controlling culture water temperature, using a plurality of Peltier elements which cause exothermic and endothermic reaction when power is supplied. In addition, the present invention also relates to a method of controlling culture water temperature in a water tank, wherein in order to enlarge the surface area where peltier elements specifically assigned to increase or reduce temperature are in contact with fluid or air, the surface area of a flow pipe is expanded, and the heat exchange efficiency is enhanced using a plurality of heat sinks.

The basic principle of the present invention, the Peltier effect, found by J. C. A. Peltier in France in 1834, is a kind of electrical properties occurred by contact covered in electronics and materials engineering. When electric current is applied to two different materials in contact with each other, endothermic and exothermic effects are generated. The Peltier effect directs the property where heat is generated when a current flows in one direction, while heat is absorbed when the current flows in the other direction.

As an example of applying reversibility of the Peltier effect as seen above, a Peltier element made of N-type semiconductor element and P-type semiconductor element connected by a metal plate, is typical. This Peltier element is also called a thermoelectric device or thermoelectric module.

When supplying power to the Peltier element, an electric current flows to the N-type semiconductor element and then flows through a connecting metal plate and P-type semiconductor element, to thereby generating heat generation while generating heat absorption in the connecting metal plate. Meanwhile, when supplying power in the opposite direction, heat absorption occurs followed by heat generation.

In general, in addition to its heating and cooling functions, the Peltier element does not generate any pollutant in disposal due to its small size and noiselessness. Thus, it can be used for refrigeration equipments for storing cosmetics or pharmaceuticals where there is no need to reduce refrigeration temperature to a very low level; for a compact refrigeration unit which can be easily installed in a small space; and for a portable refrigerator using batteries as a power source.

In addition, a Peltier element is reliable and semi-permanently used since it has a solid structure. And more precise temperature control than $.+-.0.05°$ C. (PID control) is possible with an installation of an appropriate control system since cooling is available to be lower than ambient temperature (environment temperature). Therefore, recently, technologies of applying a Peltier element to temperature controllers have been frequently developed.

However, the unit price is expensive, dropping its economic value, and it takes time to lower a temperature of a heating part to an appropriate level, since cooling efficiency of a heat absorption part depends on the temperature of the heating part reserving latent heat generated while heat absorption, dropping cooling efficiency by means of a Peltier element. On the other hand, since it takes time to raise a temperature of a heat absorption part to an appropriate level, dropping heating efficiency by means of a Peltier element, development of technologies which can improve the heat exchange efficiency is urgently needed.

SUMMARY OF THE INVENTION

The present invention provides a culture water thermostat for an aquarium for fish species wherein Peltier elements assigned to reduce or increase temperature of culture water of an aquarium for live fish species are used and a plurality of heat sinks are used to enlarge the surface area where Peltier elements are in contact with fluid or air, in order to improve heat exchange efficiency. Conventionally, the use of a single Peltier element in a temperature control device causes consumption of electricity and time which is unnecessary for temperature control due to heat or cold energy inherent in the Peltier element during cooling or heat generating. And the Peltier element is so overloaded that it is heated beyond a permissible range, generating element short-circuit inside, which can lead shortening of life of the Peltier element. To solve this problem posed, the present invention provides a method of culture water temperature control using a plurality of Peltier elements each of which is assigned to do a heating function or a cooling function respectively.

The present invention relates to a Peltier device for controlling culture water temperature for aquariums for live fish using Peltier elements, each of which is assigned to do a heating function or a cooling function respectively, which comprises a plurality of Peltier elements assigned to do heating or cooling function, a heating heat sink connected in contact with an upper surface of the Peltier element, a cooling fan mounted in the upper surface of the heating heat sink, and a chilling heat sink connected in contact with the lower surface of the Peltier element.

The heating heat sink comprises a horizontal plate having a certain thickness, a pair of side plates vertically protruded from respective opposite ends of the horizontal plate, facing each other, and a plurality of plate-shaped fins vertically protruded from the horizontal plate formed between the pair of the side plates. In another embodiment of the present invention, the heating heat sink is characterized in comprising a horizontal plate having a certain thickness, a plurality of plate-shaped fins protruded vertically from the horizontal plate, and a recessed space formed on the upper middle part of the plurality of fins to mountably receive a cooling fan.

The chilling heat sink according to the present invention comprises an outer housing forming the outer part, at least one flow pipe formed inside, at least one inlet connected to both distal end portions of the flow pipe, and at least one outlet formed corresponding to the inlet, wherein at least one flow pipe installed inside the chilling heat sink is formed with at least one integrally formed "S" shaped pipe or a plurality of "-" shaped pipes, configuring an inlet and an outlet on the lateral surface of the chilling heat sink. The cross section of the flow pipe of the chilling heat sink is formed of "X" shaped aperture.

The culture water thermostat of the present invention is essentially composed of a main operating unit and a Peltier device, wherein the main operating unit comprises a temperature measuring unit, a switch for selecting cold or hot temperature, and a power switch, and wherein the Peltier device comprises a peltier element assigned to do a cooling function, a peltier element assigned to do a heating function, a heating heat sink connected in contact to one lateral surface on the upper part of a plurality of Peltier elements; a chilling heat sink connected in contact to one lateral surface on the lower part of a plurality of Peltier elements; and a plurality of cooling fans installed on a predetermined position on the upper surface of the heating heat sink.

By using Peltier elements each of which is respectively specified in cooling or heating temperature, control of culture water temperature in an aquarium is facilitated, and heating and cooling efficiency is enhanced by separating heat radiation of the Peltier element by bringing the Peltier element into contact with a heating heat sink and a cooling heat sink independently from each other. And the surface area in contact with the fluid is maximized through the "X" shaped aperture formed with four wings protruding from the inner surface of the aperture towards the center part, directly transferring the endothermic and exothermic effects from the Peltier element to the fluid to thereby reducing the time to reach the prescribed temperature.

BRIEF DESCRIPTION OF THE DRAWINGS

(FIG. 10 is the same as FIG. 12 in Korea Patent Application No. 10-2015-0036646).

(FIG. 11 is the same as FIG. 13 in Korea Patent Application No. 10-2015-0036646).

DETAILED DESCRIPTION OF THE INVENTION

Figure 1:
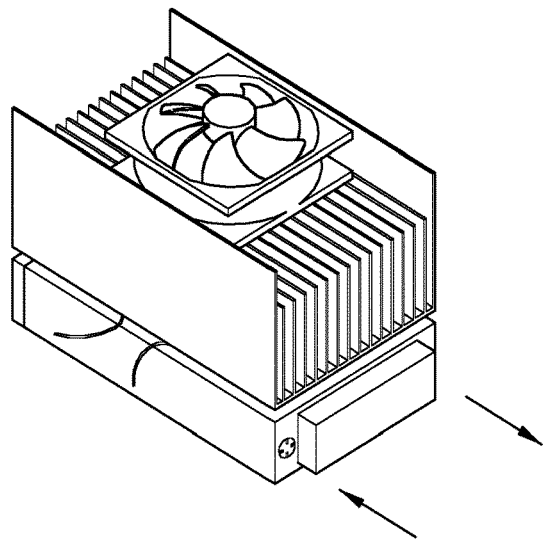
FIG. 1 shows an integrated Peltier device for temperature control of culture water of the present invention (FIG. 1 is the same as FIG. 1 in Korea Patent Application No. 10-2015-0036633).

FIG. 1 shows a Peltier device for temperature control of culture water of the present invention. The present thermostat comprises a plurality of Peltier elements (10) assigned to do heating or cooling function, a heating heat sink (20) connected in contact with an upper surface of the Peltier element (10), a cooling fan (30) mounted in the upper surface of the heating heat sink (20), and a chilling heat sink (40) connected in contact with the lower surface of the Peltier element (10). Compared to the present invention, the existing thermostat comprises a single Peltier element (10) and a single heat sink corresponding thereto, wherein the heat sink does the function of reducing the temperature of a heat generating part to an appropriate level since the cooling efficiency of a heat absorption part mounted in the Peltier element (10) depends on the temperature of the heat generating part.

Figure 2:
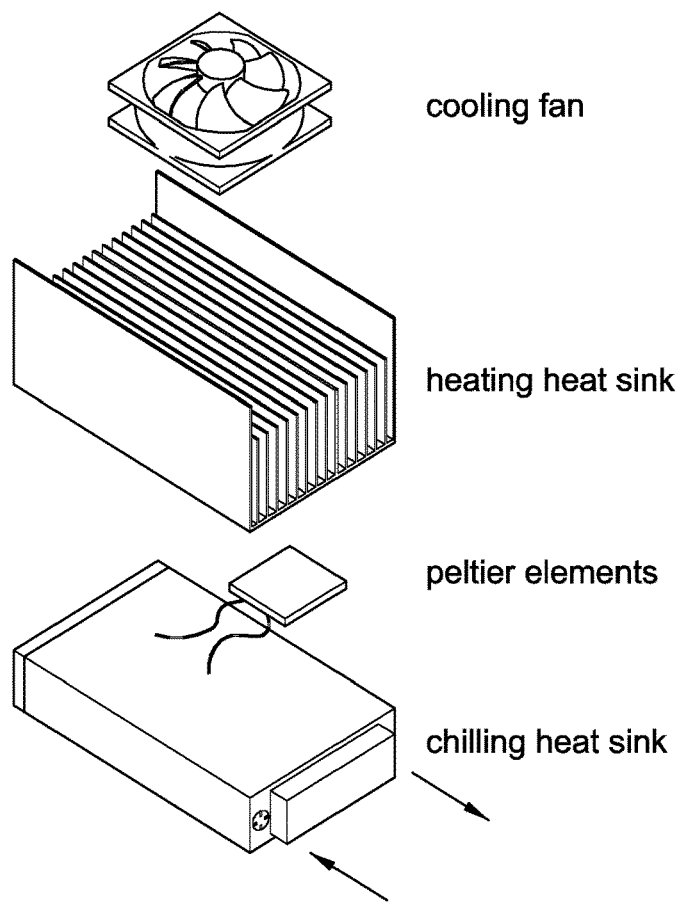
FIG. 2 shows a side view of the present Peltier device when all the components thereof are separated (FIG. 2 is the same as FIG. 2 in Korea Patent Application No. 10-2015-0036633).

The heat radiation is separated into heating and cooling in the present invention by separating the heat sink into a heating heat sink (20) and a cooling heat sink each of which is disposed on the upper surface or the lower surface of a Peltier element (10) respectively FIG. 2 shows a side view of the present Peltier device when all the components thereof are separated. The Peltier device according to the present invention comprises a heating heat sink (20) connected in contact to the upper surface of a Peltier element (10) formed with a plurality of fins, a cooling heat sink connected in contact to the lower surface of a Peltier element (10) and having fluid passing therethrough, and a cooling fan (30) mounted on the upper surface of the heating heat sink (20).

As shown in FIG. 2, the Peltier element assigned to reduce or increase temperature can be installed as a dual Peltier element (10) by adjusting the size of the components, wherein each Peltier element (10) can take each different role or the same role. The operation principle of the Peltier element (10) is such that when supplying power to the Peltier element (10), an electric current flows to the N-type semiconductor element through a first contact metal plate and then flows through a connecting metal plate and P-type semiconductor element to a second contact metal plate, to thereby generating heat radiation in the first and second contact metal plate while generating heat absorption in the connecting metal plate, resulting cooling effect.

Due to reversibility of the Peltier element (10), when supplying power in the opposite direction, heat absorption occurs in the first and second contact metal plate and heat generation occurs in the connecting metal plate. It is general to install a single Peltier element (10) in a device since a Peltier element (10) has both functions such as increasing and reducing temperature.

However, when a single Peltier element (10) performing a heating function changes its role to a cooling function, the Peltier element (10) has to drop its latent high temperature to become lower than the temperature of target fluid from which the Peltier element (10) is supposed to absorb heat, while the Peltier element (10) still contains high temperature during performing a heating function, which requires long time and decreases efficiency. On the other hand, when a single Peltier element (10) performing a cooling function changes its role to a heating function, the Peltier element (10) has to raise its latent cool temperature to become higher than the temperature of target fluid from which the Peltier element (10) is supposed to radiate heat, which requires long time and decreases efficiency.

Therefore, in the present invention, each of the Peltier elements (10) are assigned to perform each respective role such as increasing temperature or decreasing temperature. By mounting Peltier elements (10) respectively assigned to perform increasing temperature or decreasing temperature for a thermostat, the heat exchange efficiency reduced in functional exchange as seen above is recovered and the time for maintaining water temperature at a constant level is reduced, so that the target fluid subjected to heat generation or heat absorption is allowed to reach a prescribed temperature efficiently.

The heating heat sink (20) according to the present invention comprises a horizontal plate having a certain thickness, a pair of side plates vertically protruded from respective opposite ends of the horizontal plate, facing each other, and a plurality of plate-shaped fins vertically protruded from the horizontal plate formed between the pair of side plates. Due to the configuration having a plurality of plate-shape fins, the heat dissipation area in contact with air can be sufficiently secured. When a Peltier element (10) connected in contact with a lower part of the horizontal plate of the heating heat sink (20) is heated excessively, the heating heat sink (20) helps the Peltier element (10) radiate heat using secured heat dissipation area, whereas when a Peltier element (10) is excessively cool, the heating heat sink (20) transfers heat inherent in the air or in the heating heat sink (20) to the Peltier element (10).

The heating heat sink (20) is desirably made of aluminum with high thermal conductivity to increase heat exchange efficiency. Though it can also be configured with stainless steel or brass, it is not appropriate to use these materials because it may make the product heavy in weight and raise the price of each product.

The chilling heat sink (40) according to the present invention comprises an outer housing forming the outer part, at least one flow pipe (60) formed inside, at least one inlet (60A) connected to both distal end portions of the flow pipe (60), and at least one outlet (60B) formed corresponding to the inlet (60A), wherein at least one flow pipe (60) installed inside the chilling heat sink (40) is formed with at least one integrally formed "S" shaped pipe or a plurality of "-" shaped pipes. On each distal ends of the flow pipe (60), an inlet and an outlet (60B) for injection or discharge of fluid are respectively connected, and the inlet and outlet (60A, 60B) can be configured on the same side or on the side opposite to the chilling heat sink (40).

Figure 3:
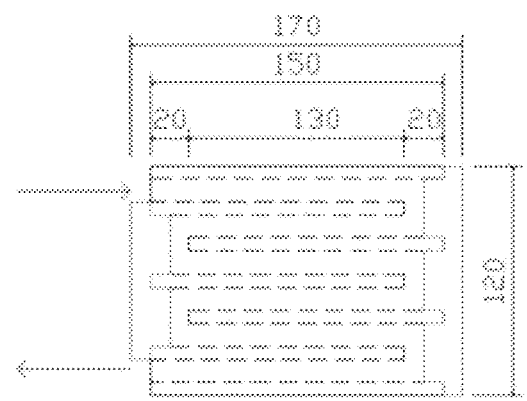
FIG. 3 shows an internal top view and a side view of a chilling heat sink of the present invention (FIG. 3 is the same as FIG. 6 in Korea Patent Application No. 10-2015-0036633).
Figure 3:
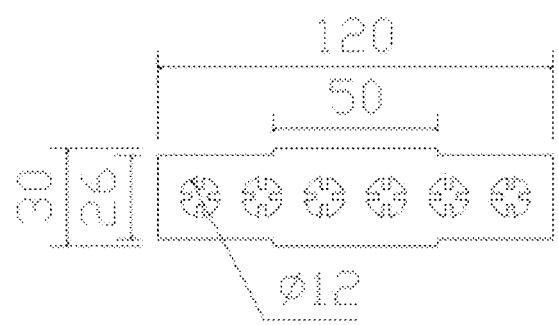

FIG. 3 illustrates an internal top surface of the chilling heat sink (40) and a side view thereof. FIG. 3 illustrates a flow pipe (60) formed to have a zigzag-shaped winding like a letter "S" in integral manner. It is possible to select and apply one of "S" type and "-" type depending on the purposes. Comparing Example 1 having an integrally formed flow pipe (60) composed of one or more than one "S" type flow tubes to Example 2 having a plurality of "-" type flow tubes, the velocity of the fluid passing through the pipe in Example 1 is relatively slow, so it takes more time to pass the same amount of fluid than in Example 2. However, it is more accurate to reach the predetermined temperature with regard to the function of heating or cooling.

Meanwhile, the velocity of the fluid passing through the pipe in Example 2 is relatively fast, so it takes less time to pass the same amount of fluid than in Example 1. However, it is less accurate to reach the predetermined temperature and it takes more time to reach the set temperature with regard to the function of heating or cooling. The bottom part of FIG. 3 shows a side view of the chilling heat sink (40), wherein a plurality of "-" type flow tubes are formed in the chilling heat sink (40) and a plurality of inlets and outlets (60A, 60B) are formed on the lateral surfaces of the chilling heat sink (40).

In the chilling heat sink (40), at least one flow pipe (60), and at least one inlet (60A) and outlet (60B) are connected in the form of a pipe, of which the cross section has "X" shape aperture formed by four wings respectively protruded from the inner surface of the pipe toward the center part. The purpose of this "X" shape structure is to enlarge a contact area where culture water fluid input to the flow pipe (60) contacts the inner part of the chilling heat sink (40). When the fluid flows through the "X" shape aperture of the flow pipe (60) in the chilling heat sink (40), the contact area of the heat transferred into the inner part of the chilling heat sink (40) and the fluid in the aperture is enlarged, whereby exothermic or endothermic reaction of culture water is effectively generated.

Figure 4:
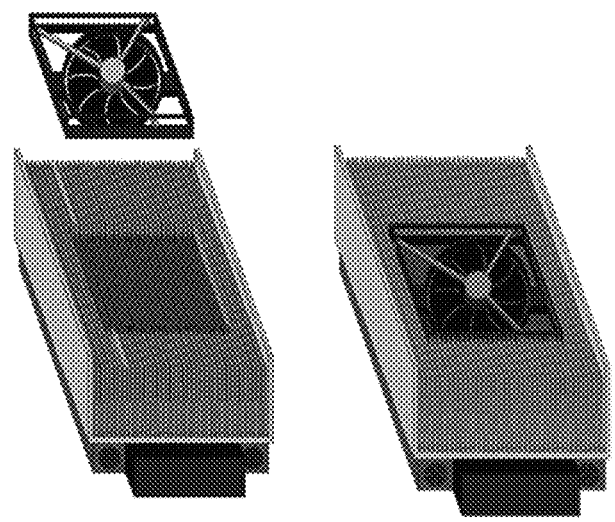
FIG. 4 shows a perspective view of an improved heating heat sink of the present invention (FIG. 4 is the same as FIG. 7 in Korea Patent Application No. 10-2015-0036633).

FIG. 4 shows a heating heat sink (20) provided with a fixing groove and a cooling fan, and combination thereof. The heating heat sink (20) comprises a horizontal plate having a certain thickness, a plurality of plate-shaped fins vertically protruded from the horizontal plate, and a recessed space (24) to receive a cooling fan (30) on the upper middle portion of the plate-shaped fins. By inserting the cooling fan (30) in the recessed space (24) on the upper middle portion of the chilling heat sink (40), the overall size of the Peltier device can be reduced, to thereby obtain a small and compact size of a thermostat containing the Peltier device, and by narrowing the distance between the heating heat sink (20) and the cooling fan (30), the heat in the inner part of the Peltier element (10) can be directly radiated.

Figure 5:
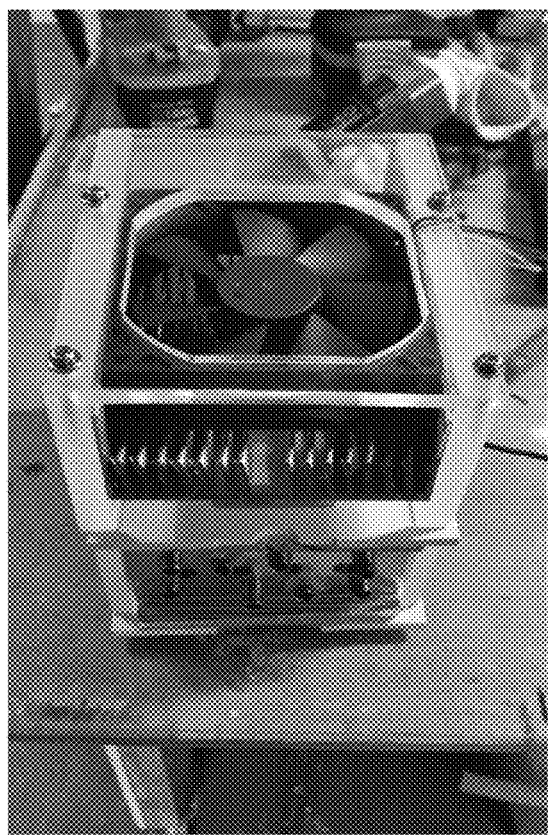
FIG. 5 shows a front perspective view of the Peltier device of the present invention (FIG. 5 is the same as FIG. 1 in Korea Patent Application No. 10-2015-0036646).

FIG. 5 shows a front perspective view of the present thermostat provided with a plurality of Peltier elements (10). FIG. 5 shows a Peltier device without a main operating unit, which comprises Peltier elements (10), a heating heat sink (20) and a chilling heat sink (40) connected in contact respectively to the upper and lower surface of the Peltier element (10), and a cooling fan (30) positioned on a lateral surface of the heating heat sink (20). The thermostat according to the present invention, generating endothermic reaction and exothermic reaction simultaneously, is provided with a cooling block made of insulation material and in contact with a heat absorbing surface of the Peltier element (10), a cooling fan (30) formed on a lateral surface of the cooling block, a heating block in contact with a heat generating surface of the Peltier element (10), and a heating fan formed on a lateral surface of the heating block. The Peltier element (10) having a solid structure, is reliable and semi-permanently used, and due to its small size, efficient use of space is possible. In addition, an accurate control of temperature is possible with an appropriate control system.

The use of a single Peltier element (10) in a temperature control device causes consumption of electricity and time which is unnecessary for temperature control due to heat or cold energy inherent in the Peltier element (10) while performing cooling or heat generating functions. Though cooling effect or heat absorbing effect is generally determined in proportion to the voltage applied, a single Peltier element (10) does not improve its ability any more once it reaches a certain performance level. In addition, if a kind of thermal resistance means, that is, a heat sink is not attached on the heat generating surface, the temperature rises easily, and if the temperature rises beyond permissible temperature, a short circuit is generated in an element of a Peltier device, resulting in damages and shortening the life span of the Peltier element (10).

In this invention, by using a plurality of Peltier elements (10) and specifying the function of each Peltier element (10) as a cooling function or a heating function respectively, provided are a thermostat and a method of temperature control using the thermostat, enhancing efficiency of temperature control and securing stable operation.

Figure 6:
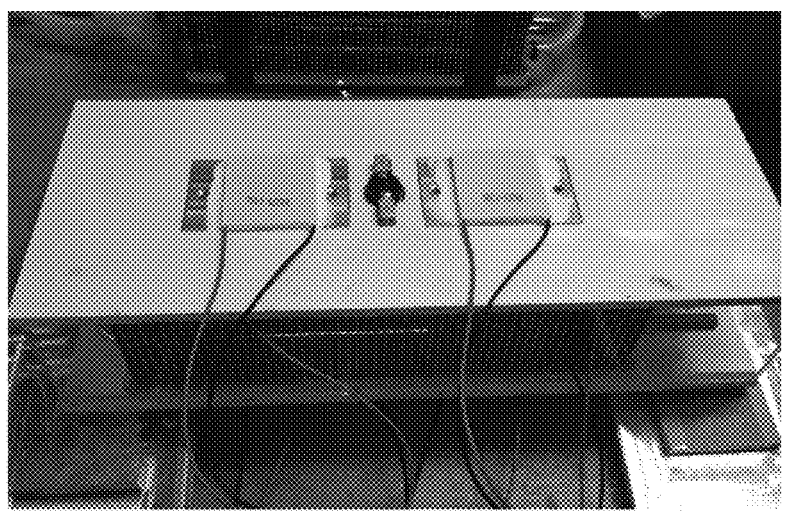
FIG. 6 shows a state in which a plurality of Peltier elements are mounted on the upper surface of the chilling heat sink (FIG. 6 is the same as FIG. 3 in Korea Patent Application No. 10-2015-0036646).

FIG. 6 shows a state in which a plurality of Peltier elements (10) are mounted on the upper surface of the chilling heat sink (40) equipped with a flow tube as a component of the present Peltier device. The chilling heat sink (40) is provided with one or more than one flow tube mounted thereon and a plurality of contact plates on a prescribed position of the upper part, wherein the contact plate is made of aluminum material having high conductivity and a space where a plurality of peltier elements (10) remain in contact is provided.

The contact plate can be configured with a purpose of improving heat exchange efficiency, by enlarging the contact area with the fluid depending on the number of the Peltier elements (10) to be mounted. The chilling heat sink (40) comprises an outer housing forming the outer part and at least one flow pipe (60) installed in the inside, wherein one or more than one inlet (60A) or outlet (60B) are configured to be connected to both distal ends of the flow tube on the both lateral surfaces of the chilling heat sink (40).

The flow pipe (60) installed in the chilling heat sink (40) is one selected from an integrally formed "S" shaped pipe and a plurality of "-" shaped pipes. The flow pipe (60) guides the input fluid to pass through the inside. The inlet (60A), the outlet (60B) and the flow tube have a connected aperture, of which the cross section has "X" shaped aperture or "-" shaped aperture formed by four wings respectively protruded from the inner surface of the pipe toward the center. Due to the shape of the aperture, the contact area with the fluid is enlarged to thereby directly transfer the heat generated from the Peltier element (10) to the fluid.

Figure 7:
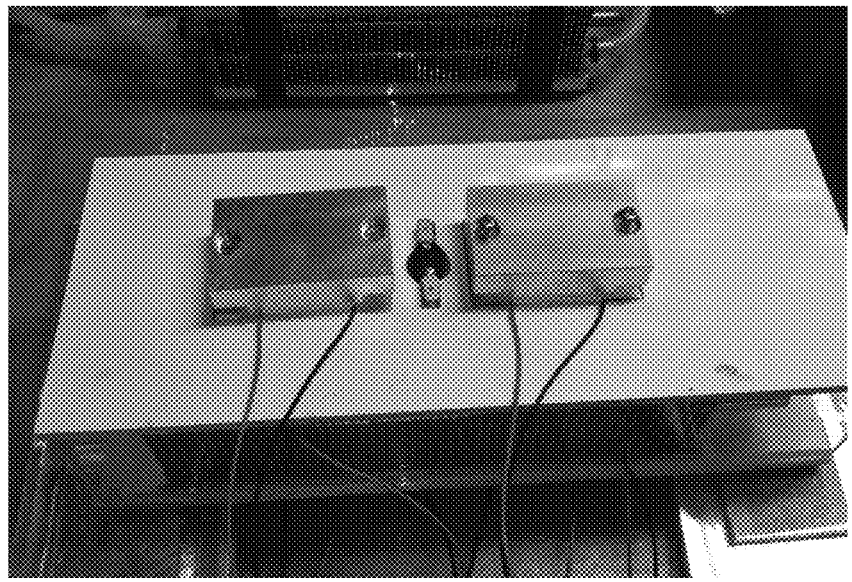
FIG. 7 shows a state in which fixing members for fixing a plurality of Peltier elements are installed (FIG. 7 is the same as FIG. 4 in Korea Patent Application No. 10-2015-0036646).

FIG. 7 shows a state in which fixing members (12) for fixing a plurality of Peltier elements (10) are installed, wherein a chilling heat sink (40) is equipped with at least one flow pipe (60), at least one contact plate and fixing member (12) are provided on the upper surface of the chilling heat sink (40), the contact plate and fixing member (12) are mutually engaged by means of at least one engaging member, and a Peltier element (10) is fixedly mounted between the contact plate and the fixing member (12).

In order to effectively exchange heat to the fluid passing through the inside of the chilling heat sink (40), the contact plate and the Peltier element (10) located on the upper part of the chilling heat sink (40) should be in contact when they are installed. The fixing member (12) located on the upper surface of the Peltier element (10) is preferably made of metal plate of aluminum, ceramic, brass, etc. which has high conductivity and high surface area to be suitable for heat radiation of the Peltier element (10). When it is made of a conventional material, it is difficult to avoid overheating of the Peltier element (10). Thus a gap between the Peltier element (10) and the fixing member (12) needs to be formed by an engaging member connecting the contact plate and the fixing member (12).

Figure 8:
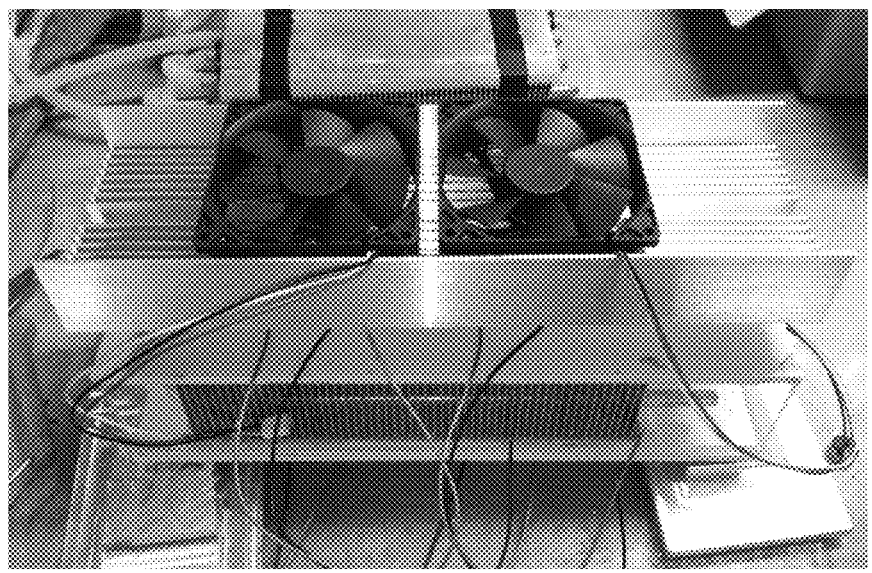
FIG. 8 shows a state in which a plurality of cooling fans are mounted on the upper part of the heating heat sink (FIG. 8 is the same as FIG. 6 in Korea Patent Application No. 10-2015-0036646).

FIG. 8 shows a state in which a heating heat sink (20) is installed on the upper part of the fixing member (12) and a plurality of cooling fans (30) are mounted on the upper part of the heating heat sink (20). The heating sink comprises a horizontal plate having a certain thickness, a pair of side plates vertically protruded from respective opposite ends of the horizontal plate, facing each other, and a plurality of plate-shaped fins vertically protruded from the horizontal plate formed between the pair of side plates. The heating heat sink (20) to be used in the present invention can be modified to be applied by a person skilled in the art in the shape and structure. However, a fixing groove for mounting a cooling fan (30) at an arbitrary position on an upper surface of the heating heat sink (20) should be configured in common.

In another embodiment of the present invention, at an arbitrary position on the upper part of the heating heat sink (20), one or more than one recessed space (24) having a height and a width as big as those of the cooling fan (30) may be configured to receivably mount the cooling fan (30) therein. (see FIG. 7.) By inserting the cooling fan (30) in the recessed space (24) on the upper middle portion of the chilling heat sink (40), the overall size of the Peltier device can be reduced, to thereby obtain a small and compact size of a thermostat containing the Peltier device, and by narrowing the distance between the heating heat sink (20) and the cooling fan (30), the heat in the inner part of the Peltier element (10) can be directly radiated.

The culture water thermostat of the present invention is essentially composed of a main operating unit and a Peltier device, wherein the main operating unit comprises a temperature measuring unit, a switch for selecting cold or hot temperature, and a power switch. The temperature measuring unit, mounted in the main operating unit, measures the temperature of the fluid passing through the inside of the chilling heat sink (40) and adjusts the fluid to reach a set temperature using the switch for selecting cold or hot temperature.

In an embodiment of the present invention, the main operating unit further comprises a temperature setting unit and a control part. After the temperature setting unit sets a specific temperature for the fluid and the temperature measuring unit detects the temperature of the fluid passing through the inside of the Peltier device, the control part calculates the optimal temperature of the respective Peltier element (10) to allow the fluid to reach the set temperature in real time, and transfers the result to the Peltier element (10) assigned to perform the cooling function and the other Peltier element (10) assigned to perform the heating function respectively, in order for the fluid to reach the set temperature rapidly and accurately.

Figure 9:
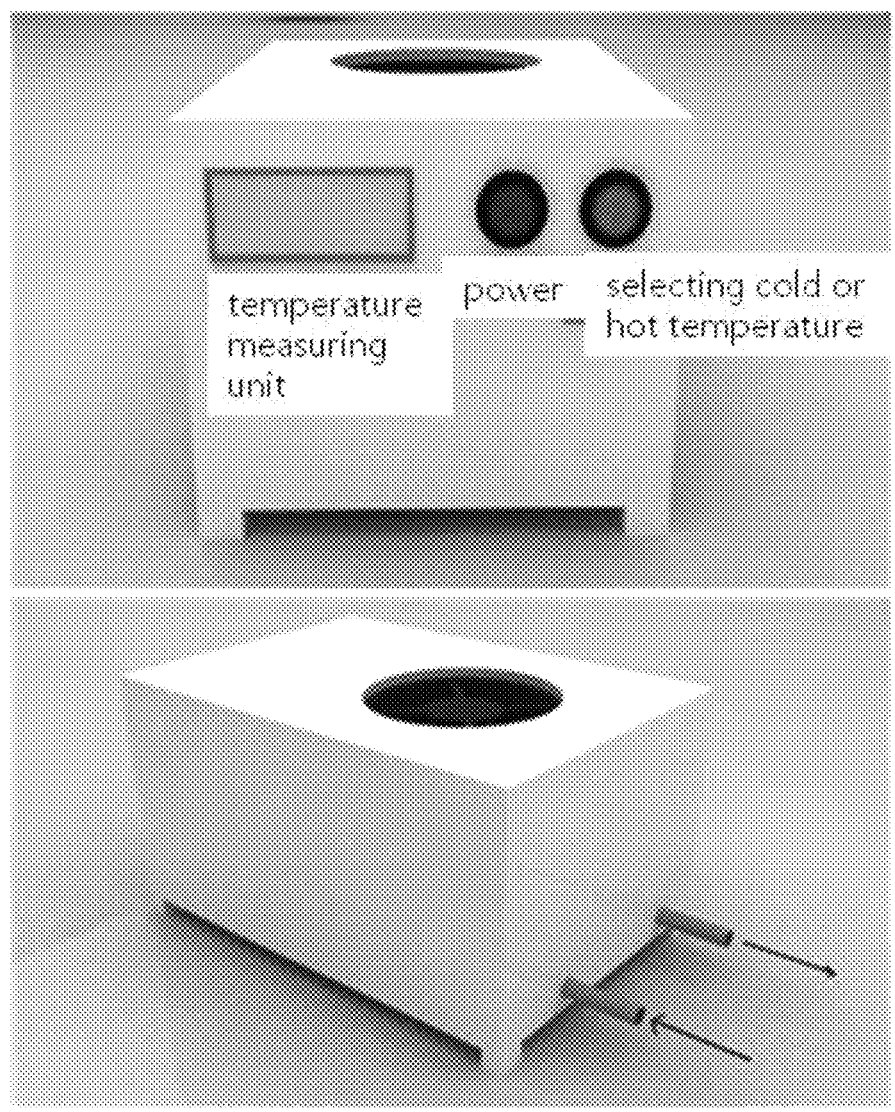
FIG. 9 shows a front and rear view of the main operating unit of the present invention (FIG. 9 is the same as FIGS. 10 and 11 in Korea Patent Application No. 10-2015-0036646).

FIG. 9 shows a rear view of the main operating unit (50) of the present invention. As shown in FIG. 9, the upper surface of the main operating unit (50) is provided with one or more than one penetration hole (52) to expose the cooling fan (30) of the Peltier element (10) to the outside; and the rear surface of the main operating unit (50) is provided with one or more than one inlet (60A) and outlet (60B) respectively connected to the flow tube formed inside of the Peltier device to be exposed to the outside of the main operating unit (50).

The Peltier device is usually installed within the inner frame of the main reservoir and connected with a main reservoir line, to thereby adjust the temperature of the culture water supplied to a water tank to reach a set temperature. An opening part of the main reservoir line pipe is installed in connection with an outlet having an "X" shaped aperture connected to the chilling heat sink (40), and the culture water flows into the flow pipe (60) of the Peltier device through the inlet (60A) formed in the chilling heat sink (40), so that the culture water is decreased or increased in its temperature and then supplied to the water tank.

Figure 10:
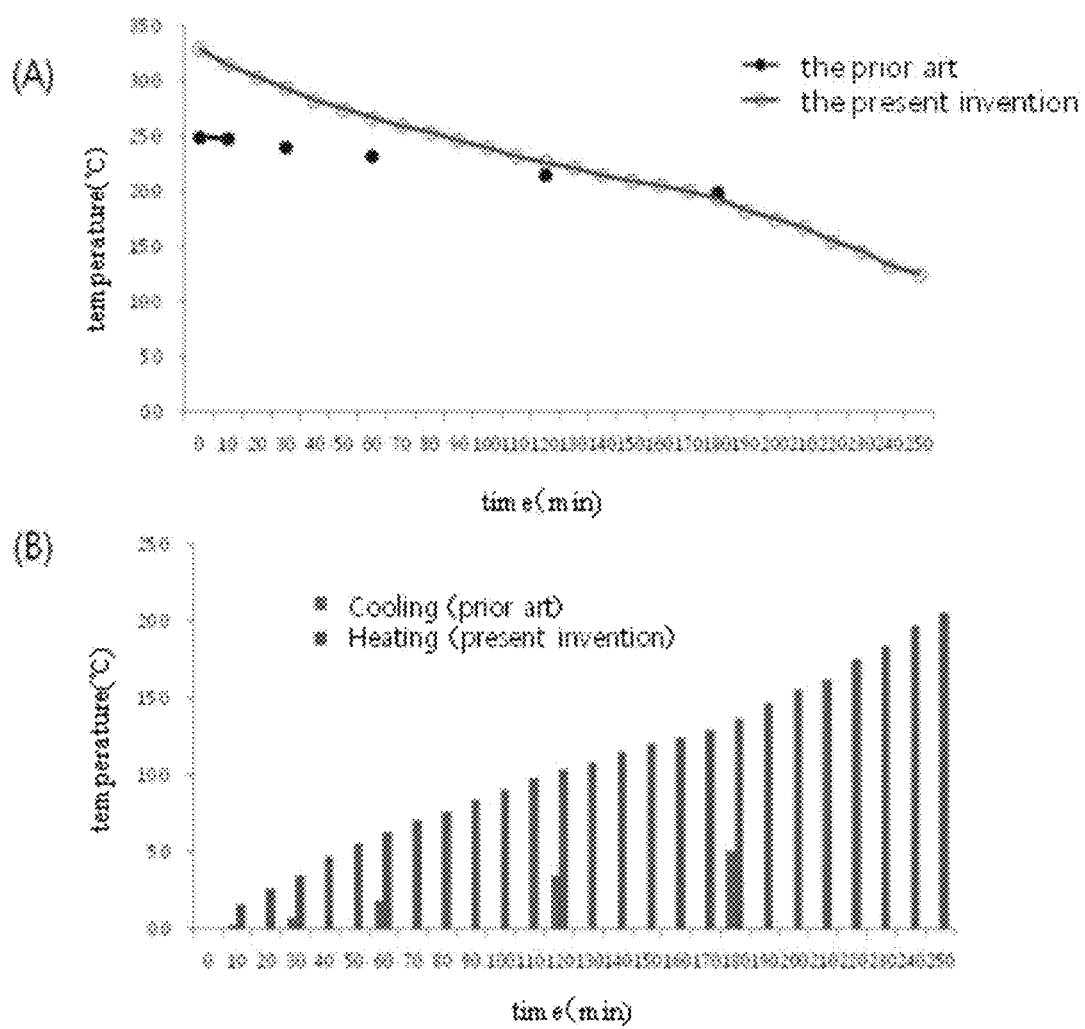
FIG. 10 shows the temperature variation trend (A) and the timely trend of decreasing water temperature (B) according to the present invention and the prior art when a cooling function is set.

2. The Temperature Adjustment Using a Thermostat Mounted with a Plurality of Peltier Elements FIG. 10 shows the temperature variation trend (A) and the timely trend of decreasing water temperature (B) according to the present invention and the prior art when a cooling function is set. The timely trend of decreasing water temperature is shown in Table 1 in numerical figures.

The blue line and point shown in (A) illustrates the water temperature variation trend according to the existing invention when the cooling function is set. The red line and point shown in (A) illustrates the water temperature variation trend according to the present invention. According to the existing invention, set in a cooling function, a fluid of 25° C. dropped to 23.5° C. after a lapse of 60 minutes, to 21.6° C. after a lapse of 120 minutes, and to 20.0° C. after a lapse of 180 minutes. Meanwhile, according to the present invention, set in a cooling function, a fluid of 33° C. dropped to 26.7° C. after a lapse of 60 minutes, to 22.7° C. after a lapse of 120 minutes, and to 19.4° C. after a lapse of 180 minutes, confirming that the decline of the present invention is more rapid than that of the existing invention.

The blue bar graph illustrated in (B) shows the degree of temperature reducing per time according to the existing invention, and the red bar shows the degree of temperature reducing per time according to the present invention. After a lapse of 60 minutes, the water temperature becomes −1.8° C. in the existing invention and −6.3° C. in the present invention. After a lapse of 120 minutes, the water temperature becomes −3.4° C. in the existing invention and −10.3° C. in the present invention. After a lapse of 180 minutes, the water temperature becomes −5.0° C. in the existing invention and −13.6° C. in the present invention. The experiment confirms that the decline of the present invention is more rapid than that of the existing invention.

That is, set in a cooling function, a plurality of Peltier elements (10) are operated simultaneously increasing the efficiency of reducing temperature, and with an operation of the chilling heat sink (40) and the flow pipe (60), the efficiency rises compared to the existing invention.

TABLE 1

The trend of decreasing water temperature according to the lapse of time

| Elapsed time (min.) | Existing Invention (° C.) | Present Invention (° C.) | hourly variation trend (Existing Invention/° C.) | hourly variation trend (Present Invention/° C.) |
|---|---|---|---|---|
| 0 | 25.0 | 33.0 | 0.0 | 0.0 |
| 10 | 24.8 | 31.5 | −0.2 | −1.5 |
| 20 | | 30.4 | | −2.6 |
| 30 | 24.1 | 29.4 | −0.7 | −3.4 |
| 40 | | 28.3 | | −4.7 |
| 50 | | 27.5 | | −5.5 |
| 60 | 23.2 | 26.7 | −1.8 | −6.3 |
| 70 | | 26.0 | | −7.0 |
| 80 | | 25.4 | | −7.6 |
| 90 | | 24.7 | | −8.3 |
| 100 | | 24.0 | | −9.0 |
| 110 | | 23.2 | | −9.8 |
| 120 | 21.6 | 22.7 | −3.4 | −10.3 |
| 130 | | 22.2 | | −10.8 |
| 140 | | 21.5 | | −11.5 |
| 150 | | 21.0 | | −12.0 |
| 160 | | 20.6 | | −12.4 |
| 170 | | 20.1 | | −12.9 |
| 180 | 20.0 | 19.4 | −5.0 | −13.6 |
| 190 | | 18.3 | | −14.7 |
| 200 | | 17.5 | | −15.5 |
| 210 | | 16.8 | | −16.2 |
| 220 | | 15.5 | | −17.5 |
| 230 | | 14.6 | | −18.4 |
| 240 | | 13.3 | | −19.7 |
| 250 | | 12.5 | | −20.5 |

Figure 11:
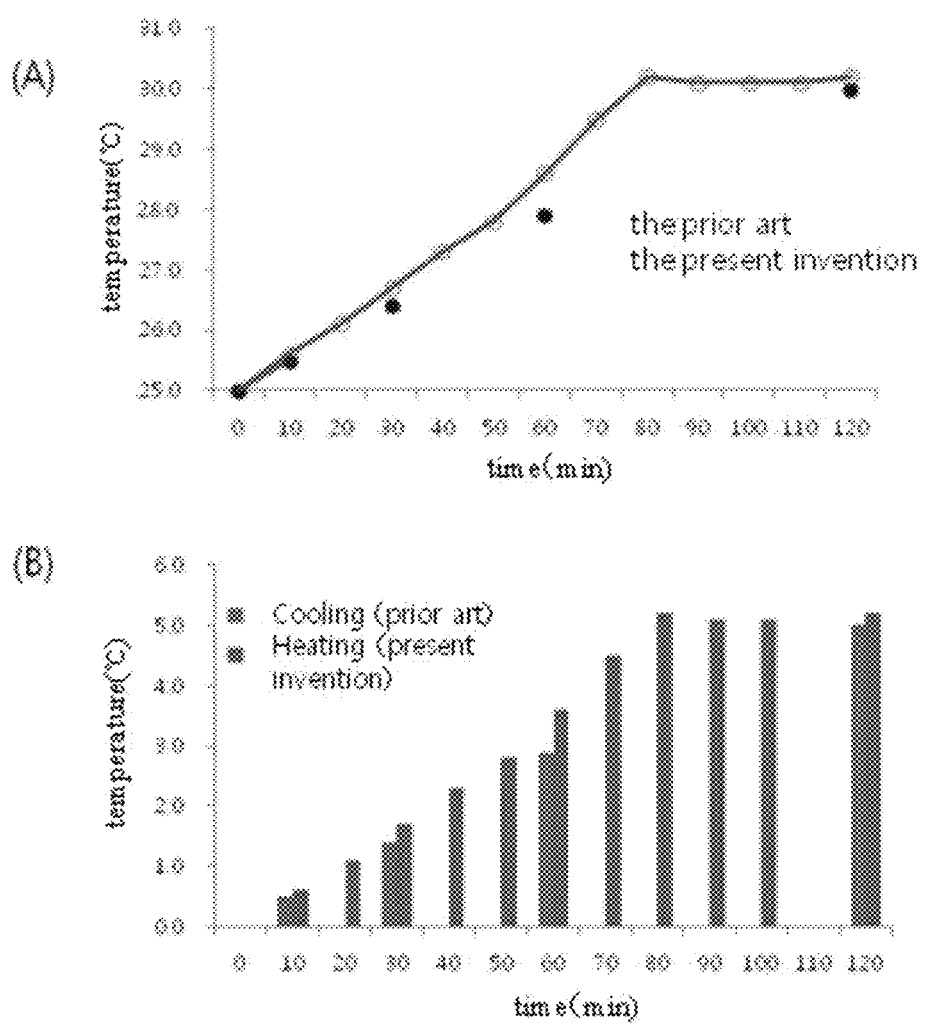
FIG. 11 shows the temperature change (A) and the timely trend of rising water temperature (B) according to the present invention and the prior art when a heating function is set.

FIG. 11 shows the temperature variation trend (A) and the timely trend of increasing water temperature (B) according to the present invention and the prior art when a heating function is set. In both inventions, the heating function for raising water temperature is set for raising a fluid of 25° C. to reach 30° C. The variation trend according the lapse of time is illustrated in Table 2 with numerical figures.

The blue line and point shown in (A) illustrates the water temperature variation trend according to the existing invention when the heating function is set. The red line and point shown in (A) illustrates the water temperature variation trend according to the present invention. According to the existing invention, set in a heating function, a fluid of 25° C. reaches 26.4° C. after a lapse of 30 minutes, to 27.9° C. after a lapse of 60 minutes, and to 30.0° C. after a lapse of 120 minutes. Meanwhile, according to the present invention, set in a heating function, a fluid of 25° C. reaches 26.7° C. after a lapse of 30 minutes, to 28.6° C. after a lapse of 60 minutes, and to 30.2° C. after a lapse of 80 minutes, showing a big difference in the time for reaching a certain temperature.

The blue bar graph illustrated in (B) shows the degree of temperature rising per time according to the existing invention and the red bar shows the degree of temperature rising per time according to the present invention. After a lapse of 30 minutes, the water temperature becomes +1.4° C. in the existing invention and +1.7° C. in the present invention. After a lapse of 60 minutes, the water temperature becomes +2.9° C. in the existing invention and +3.6° C. in the present invention. After a lapse of 80 minutes, the water temperature becomes +3.0° C. in the existing invention, but +5.2° C. in the present invention, already reaching a set temperature.

TABLE 2

The trend of rising water temperature according to the lapse of time

| Elapsed time (min.) | Existing Invention (° C.) | Present Invention (° C.) | hourly variation trend (Existing Invention/° C.) | hourly variation trend (Present Invention/° C.) |
|---|---|---|---|---|
| 0 | 25.0 | 25.0 | 0.0 | 0.0 |
| 10 | 25.5 | 25.6 | +0.5 | +0.6 |
| 20 | | 26.1 | | +1.1 |
| 30 | 26.4 | 26.7 | +1.4 | +1.7 |
| 40 | | 27.3 | | +2.3 |
| 50 | | 27.8 | | +2.8 |
| 60 | 27.9 | 28.6 | +2.9 | +3.6 |
| 70 | | 29.5 | | +4.5 |
| 80 | | 30.2 | | +5.2 |
| 90 | | 30.1 | | +5.1 |
| 100 | | 30.1 | | +5.1 |

TABLE 2-continued

The trend of rising water temperature according to the lapse of time

| Elapsed time (min.) | Existing Invention (° C.) | Present Invention (° C.) | hourly variation trend (Existing Invention/° C.) | hourly variation trend (Present Invention/° C.) |
| --- | --- | --- | --- | --- |
| 110 | | 30.1 | | |
| 120 | 30.0 | 30.2 | +5.0 | +5.2 |

Figure 12:
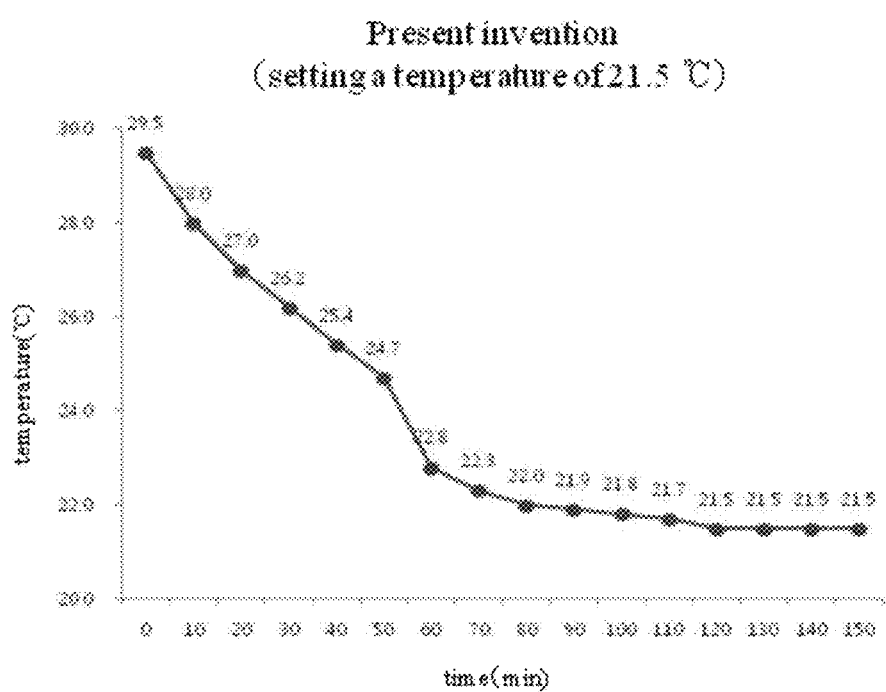
FIG. 12 shows a temperature variation due to the Peltier device of the present invention in a certain temperature (FIG. 12 is the same as FIG. 14 in Korea Patent Application No. 10-2015-0036646).

FIG. 12 shows a temperature variation to a set temperature caused by the Peltier device of the present invention, wherein a fluid of 29.5° C. is supposed to reach 21.5° C. The variation trend of water temperature according the lapse of time is illustrated in Table 3 with numerical figures.

As shown in FIG. 12, after setting a temperature, a fluid of 29.5° C. rapidly falls in its temperature, reaching close to the set temperature after 60-70 minutes, and exactly reaches 21.5° C.

When adjusting water temperature using a plurality of Peltier elements (10), two Peltier elements (10) perform the same function to get to close to the set temperature by increasing or decreasing water temperature. And once the water temperature rises to close to the set temperature, the plurality of Peltier elements (10) repeat increasing and decreasing the water temperature for constantly controlling the set temperature, to finally reach accurately to the set temperature.

TABLE 3

The trend of water temperature variations according to the lapse of time

| Elapsed time (min.) | Present Invention (set in 21.5° C.) |
| --- | --- |
| 0 | 29.5 |
| 10 | 28.0 |
| 20 | 27.0 |
| 30 | 26.2 |
| 40 | 25.4 |
| 50 | 24.7 |
| 60 | 22.8 |
| 70 | 22.3 |
| 80 | 22.0 |
| 90 | 21.9 |
| 100 | 21.8 |
| 110 | 21.7 |
| 120 | 21.5 |
| 130 | 21.5 |
| 140 | 21.5 |
| 150 | 21.5 |

As seen above, when using a single Peltier element (10), the single Peltier element (10) is supposed to perform both of the heating function and the cooling function, so that temperature adjustment is not quick. On the other hand, when using a plurality of Peltier elements (10), each Peltier element (10) is assigned to perform one of the heating function or the cooling function, so that the return to the set temperature is more quickly achieved than that in using a single Peltier element (10).

By using a plurality of Peltier elements (10), each of which is assigned to do either a heating function or a cooling function, enlarging the surface area of the flow pipe (60), and using divided heat sink with a purpose to enlarge the surface area in contact with the fluid achieving higher heat exchange efficiency, and by operating dual Peltier elements (10) to decrease the time required for water temperature to reach a set temperature and to minutely adjust water temperature numerically, the aquarium thermostat according to the present invention facilitates temperature control of the culture water in the aquarium for live fish and can be applicable for a variety of purposes in various forms.

What is claimed is:

1. A culture water thermostat using a plurality of Peltier elements, characterized in that:
    each of the plurality of Peltier elements includes an upper surface in thermal contact with a heat sink which has a plurality of plate-shaped fins protruding vertically away from the upper surface of each the plurality of Peltier elements,
    wherein at least one of the plurality of Peltier elements is assigned to perform a heating activity, while at least another of the plurality of Peltier elements is assigned to perform a cooling activity simultaneous the heating activity of the at least one of the plurality of Peltier elements, and during the heating activity, an upper surface of the at least one of the plurality of Peltier elements creates an exothermic reaction, and during the cooling activity, an upper surface of the at least another of the plurality of Peltier elements creates an endothermic reaction, and
    a chilling heat sink and power source are in thermal contact on a lower surface of each the plurality of Peltier elements,
    wherein the chilling heat sink comprises an outer housing containing at least one flow pipe formed inside the outer housing, the at least one flow pipe having distal ends, and the outer housing having at least one inlet and at least one outlet fluidly connected to the distal ends of the at least one flow pipe, and
    wherein the heating heat sink comprises a horizontal plate having a certain thickness, a pair of side plates vertically protruded from respective opposite ends of the horizontal plate, facing each other, and the plurality of plate-shaped fins vertically protruded from the horizontal plate formed between the pair of side plates, and
    wherein a cooling fan is mounted in a recessed space formed on an upper middle part of the plurality of plate-shaped fins, and
    wherein the at least one flow pipe is formed to have a zigzag-shaped winding like a letter "S", and a cross-section of the flow pipe is configured like "X" shaped aperture, which is formed by four wings respectively protruded from an inner surface of the flow pipe toward a center part of the flow pipe.

2. A method of controlling culture water temperature using a plurality of Peltier elements comprising the steps of:
    supplying power source to a culture water thermostat and setting an optimal temperature of culture water;
    driving some of the plurality of Peltier elements specified in heating purpose to heat the culture water to a first prescribed temperature and operating other of the plurality of Peltier elements specified in cooling purpose to cool to a second prescribed temperature; and
    driving the some of the plurality of Peltier elements in a heating purpose creating an exothermic reaction, while simultaneously driving the other of the plurality of Peltier elements in a cooling purpose creating an endothermic reaction, to continue to minutely manage the temperature of the culture water to remain in a prescribed temperature range;
    assigning upper surfaces of the some of the plurality of Peltier elements to perform a heating activity, while simultaneously assigning upper surfaces of the other of the plurality of Peltier elements to perform a cooling activity;

disposing on the upper surfaces of the plurality of Peltier elements a heat sink including a plurality of plate-shaped fins protruding vertically from the upper surfaces of the plurality of Peltier elements;

forming a recessed space on an upper middle part of the plurality of plate-shaped fins;

mounting a cooling fan in the recessed space; and providing a chilling heat sink and power source on lower surfaces of the plurality of Peltier elements.

\* \* \* \* \*